United States Patent
Hayer et al.

(10) Patent No.: US 7,941,544 B2
(45) Date of Patent: May 10, 2011

(54) SESSION MANAGER FOR WEB-BASED APPLICATIONS

(75) Inventors: Roman Hayer, Saarbruecken (DE); Timo Kohr, Mandelbachtal (DE); Jan Ohl, Saarlouis (DE); Patrick Zimmermann, Tholey (DE); Joachim Hartmann, St. Ingbert (DE); Marek Barwicki, Mannheim (DE)

(73) Assignee: SAP AG, Walldorf (DE)

( * ) Notice: Subject to any disclaimer, the term of this patent is extended or adjusted under 35 U.S.C. 154(b) by 903 days.

(21) Appl. No.: 11/082,871

(22) Filed: Mar. 18, 2005

(65) Prior Publication Data

US 2006/0212589 A1 Sep. 21, 2006

(51) Int. Cl.
G06F 15/16 (2006.01)
(52) U.S. Cl. ...................................................... 709/227
(58) Field of Classification Search ........... 709/227–229
See application file for complete search history.

(56) References Cited

U.S. PATENT DOCUMENTS

| | | | |
|---|---|---|---|
| 6,115,040 A | 9/2000 | Bladow et al. | |
| 6,981,048 B1* | 12/2005 | Abdolbaghian et al. | 709/228 |
| 2002/0078212 A1* | 6/2002 | Besaw et al. | 709/228 |
| 2002/0095605 A1* | 7/2002 | Royer et al. | 713/201 |
| 2003/0063119 A1* | 4/2003 | Bloomfield et al. | 345/738 |
| 2003/0139174 A1 | 7/2003 | Rao | |
| 2004/0049589 A1 | 3/2004 | Papanikolaou et al. | |
| 2004/0193699 A1 | 9/2004 | Heymann et al. | |
| 2006/0190948 A1* | 8/2006 | Burger et al. | 719/314 |

FOREIGN PATENT DOCUMENTS

WO  WO 01//97012 A2  12/2001

OTHER PUBLICATIONS

O. Levin, H.323 Uniform Resource Locator (URL) Scheme Registration, IETF RFC 3508, published on Apr. 2003.*
SOAP version 1.2 Part 1: Message Framework, W3C Proposed Recommnendation on May 7, 2003.*
SOAP version 1.2 Part 1: Message Framework, W3C Proposed Recommnendation on May 7, 2003.*

* cited by examiner

*Primary Examiner* — Joseph E Avellino
*Assistant Examiner* — Jeong S Park
(74) *Attorney, Agent, or Firm* — Kenyon & Kenyon LLP

(57) ABSTRACT

A communication manager for web-based applications receives indications of application time outs via a callback mechanism. During session initiation, the communication manager provides a termination address to an application along with a session ID. If the session times out due to inactivity, the application may signal the communication manager that the session ID is invalid by sending a message to the termination address. Alternatively, when a communication manager establishes communication sessions for several applications with a common external terminal, the communication manager may receive messages identifying terminal activity at one of the applications and may signal to the other applications to keep their sessions active.

21 Claims, 3 Drawing Sheets

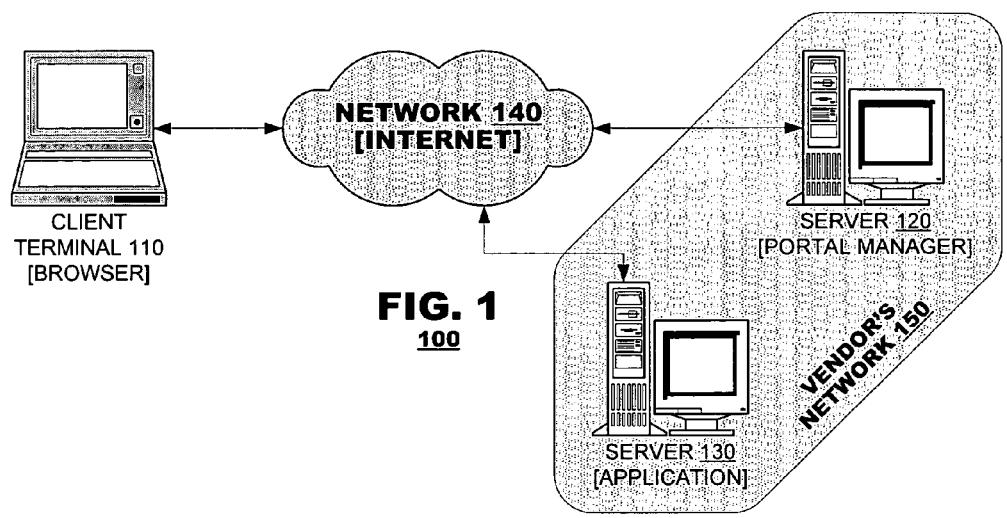
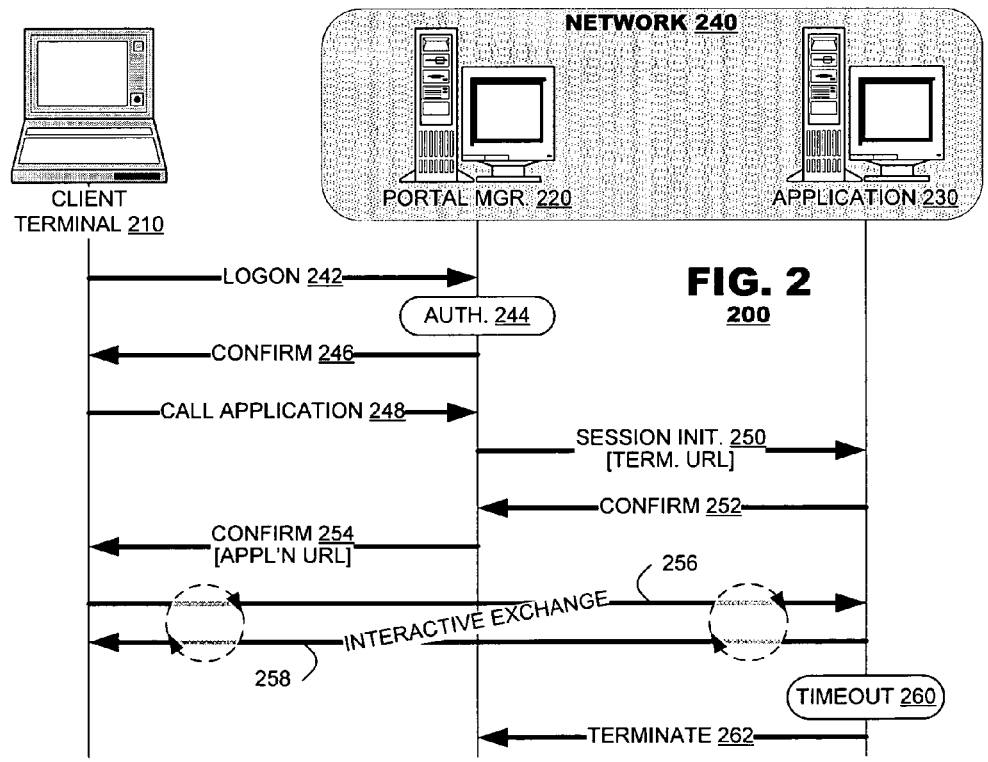

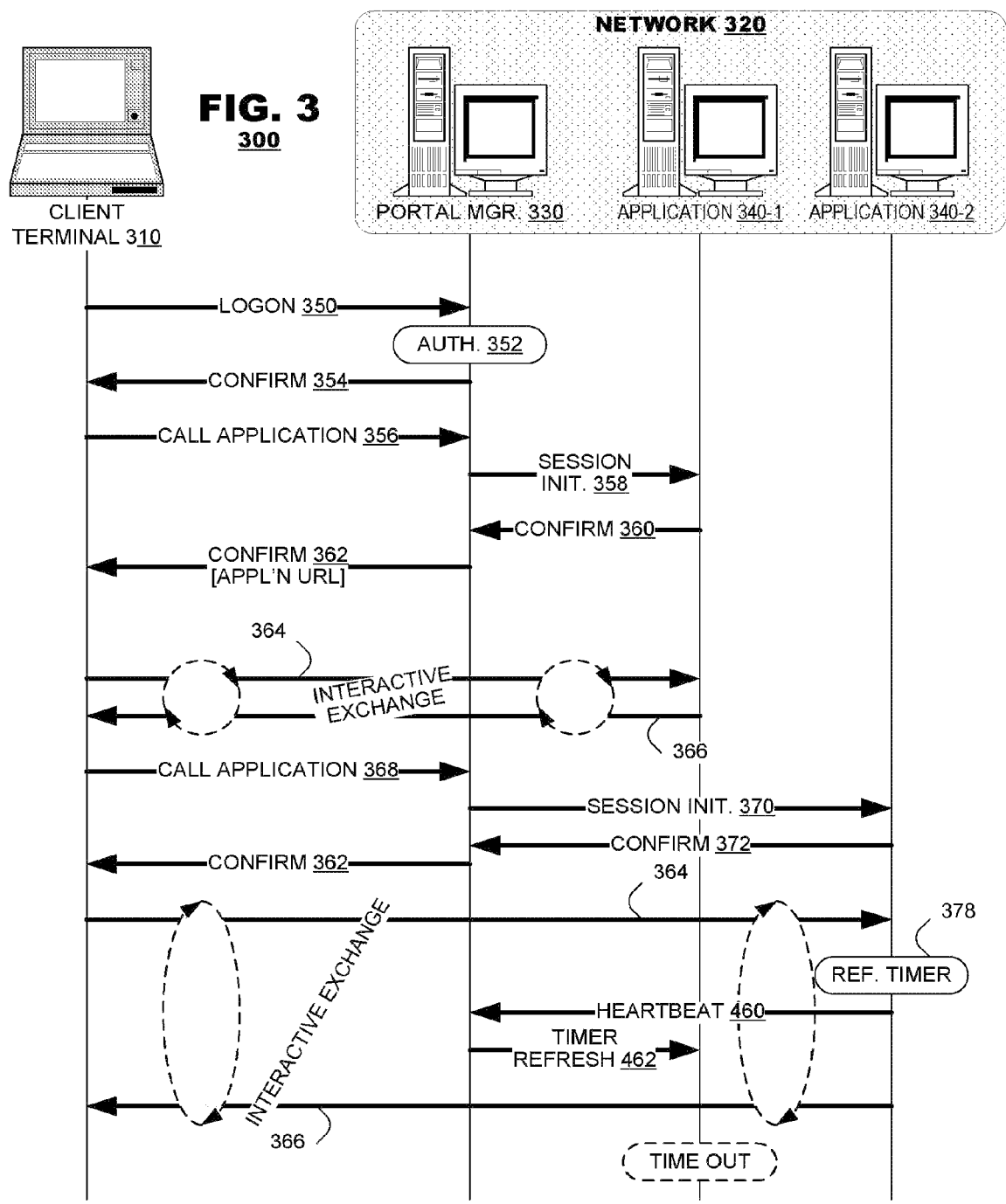

400

SESSION MANAGER FOR WEB-BASED APPLICATIONS

BACKGROUND

The present invention relates to session management in computer-supported transaction systems.

Computer-based transaction processing is becoming commonplace in ordinary business. Retailers, for example, commonly provide internet supported retail sales systems ("web shops," informally) to facilitate sales of their goods and services. In such systems, a customer at a browser-supported computer typically interacts with the retailer's computer system to select and purchase a retailer's wares. Communication is supported through a web-based portal; the communication itself is stateless. Accordingly, the retailer's computer system typically stores information regarding the customer's progress through the sales transaction. Because the communication session is stateless, the retailer's system will not be informed if a given customer abandons a transaction and leaves the vendor's web shop.

Computers that support web shops, therefore, can waste processing resources by maintaining sessions active for an inordinate amount of time. Conversely, customers' shopping experiences can be detrimentally affected if the web shops terminate inactive sessions before the customers conclude their transactions with the shops. For example, some retailers may provide services to customers through several independent applications. A customer may continuously request multiple services from a common vendor's. Independent applications in support of such services typically do not operate in an integrated fashion so that extensive activity with one application may cause a second application to time out. Alternatively, when an application times out, some systems require a customer to log completely out of the vendor's system and log back into the system before the customer can regain access to the timed out application. These events also can affect the customer's shopping experience detrimentally.

Accordingly, there is a need in the art for a coordinated session management system in computer-support transaction system. Specifically, there is a need for a session management system that tracks timed out applications and permits a customer to regain access to the applications' services without a complete disconnect and reconnect to the system. Additionally, there is a need for a session management system that monitors activity across a plurality of valid sessions and keeps the sessions active so long as a minimum activity level is met with respect to a least one of the applications.

BRIEF DESCRIPTION OF THE DRAWINGS

FIG. 1 is a simplified diagram of a computer system according to an embodiment of the present invention.

FIG. 2 is a communication flow diagram according to an embodiment of the present invention.

FIG. 3 is a communication flow diagram according to another embodiment of the present invention.

DETAILED DESCRIPTION

Figure 4:
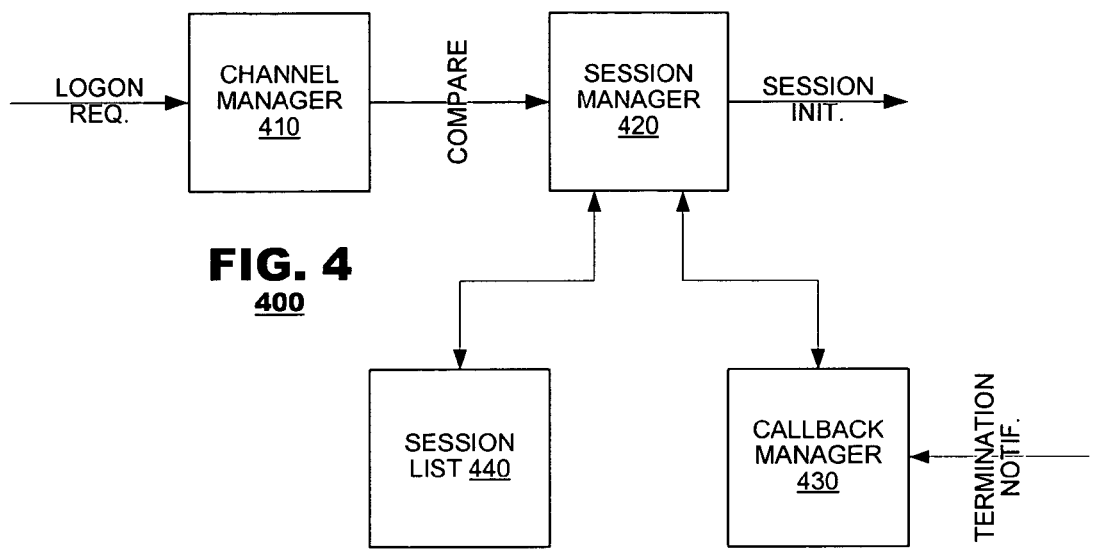
FIG. 4 is a functional block diagram of a portal manager according to an embodiment of the present invention.

Embodiments of the present invention provide a communication manager for web-based applications in which the communication manager receives indications of application time outs via a callback mechanism. During session initiation, the communication manager provides a termination address to an application along with a session ID. If the session times out due to inactivity, the application may signal the communication manager that the session ID is invalid by sending a message to the termination address. In another embodiment, where a communication manager establishes communication sessions for several applications with a common external terminal, the communication manager may receive messages identifying terminal activity at one of the applications and may signal to the other applications to keep their sessions active.

FIG. 1 is a block diagram of a computer system 100 according to an embodiment of the present invention. The system 100 may include a client terminal 110 and a plurality of servers 120-130 interconnected by a communication network 140, such as the Internet. In FIG. 1, the servers 120-130 are shown as members of a common computer network 150, labeled a "vendor's network" for ease of discussion. One server 120 is shown as a portal manager; it may authenticate new users (located at client terminals 110) to the network 150 and govern access to applications therein. Other servers, such as server 130, may execute applications within the network 150. These applications may support services provided by a vendor to operators at the various client terminals 110. The client terminals 110 themselves may execute browsers or other interface applications to maintain communication with components within the network 150.

In modern computer systems, functionality such as portal management and applications need not be provided on discretely separate computer platforms such as the separate servers 120, 130 shown in FIG. 1. It may occur, for example, that the portal management and application functions may execute as logically independent processes on a common server. In other instances, portions of the portal management and application services may be distributed across multiple servers. Such implementation differences are immaterial to the present discussion. FIG. 1 illustrates separate servers merely to facilitate presentation of the various embodiments of the present invention. The computer system of FIG. 1 can include one or more non-transitory computer-readable storage mediums having program instructions, which, when executed by at least one processor of the computer system, perform methods described herein.

FIG. 2 is a data flow diagram illustrating communication flow between a client terminal 210, a portal manager 220 and an application 230 according to an embodiment of the present invention. Interaction typically begins when the client terminal 210 attempts to log on to the vendor's network by sending a logon message 242 to the portal manager 220. The portal manager 220 may authenticate the client terminal 210 (box 244) and provide basic navigation services to the client terminal 210. For example, following authentication, the portal manager 230 may provide a home page from which the client terminal 210 may invoke various application services (represented by confirm message 246). A selection by the operator may cause the client terminal 210 to send a message 248 to the portal manager 220 invoking the application. In response, the portal manager 220 may send a session initiation message 250 to the application 230. The initiation message 250 may include an address to which the application server 230 may address later termination messages. The application 230 may confirm receipt of the session initiation message via message 252. Thereafter, the portal manager 220 may send the client terminal 210 addressing data in a confirmation message 254. The addressing data, typically a URL, permits the client terminal 210 to engage the application 230 directly. The portal manager 220 need not participate in communication flow between the client terminal 210 and the application 230.

According to an embodiment of the present invention, when the portal manager 220 grants the client terminal 210 access to the network's services, there is no need for the client terminal to authenticate itself with network applications individually. Thus, the portal manager manages synchronization with network applications, for example, to provide session IDs that identify individual clients that may access application services. The client terminal 210 and the application 230 may directly exchange data according to the application's own processes (represented by message flow 256, 258). If an operator concludes interaction by, for example logging out of the application, then session termination may be communicated from the client terminal to the portal manager. If, however, an operator abandons the application session without formally logging off (for example, the operator directs his browser to a facility that is outside the network), the application may timeout autonomously (box 260). In this event, the application may communicate a termination message 262 to the portal manager 220.

Accordingly, the foregoing embodiment of the present invention provides a synchronization feature within a multi-agent network to ensure that invalid sessions do not cause errors with user interaction. Without such a feature, if the client terminal made subsequent attempts to access the application 230 directly, the application 230 would return an error because the terminal's session would be deemed invalid. If the client terminal attempted to contact the portal manager 220 and thereafter access the application, the portal manager would not assign a new session to the client terminal because its records would indicate that the old, now invalid session was valid. To recover from the timeout, the client terminal would have had to log entirely out of the vendor's network 240 and log in again. This provides for an inadequate user experience.

Commonly, networks are not as simple as the example shown in FIG. 1. A given vendor may provide several different services, each supported by its own application. In such an implementation, timeouts may occur if an operator logs into several applications but activity in one application becomes suspended because the operator is active in another application.

FIG. 3 illustrates communication flow according to another embodiment of the present invention. In this embodiment, a client terminal 310 is provided in communication with a vendor's network 320 that includes a portal manager 330 and several disparate applications (shown as 340-1, 340-2 in FIG. 3). As described, the portal manager 330 may govern access to the vendor's network 320 by authenticating users as they log on and by providing navigation tools that lead to the applications themselves. Each of the applications may support various services offered by a vendor; they may include processes and data structures (not shown) that are germane to the applications' role in such services.

As in the prior embodiment, communication flow may begin when a client terminal 310 attempts to log onto the network 320 via the portal manager 330 (message 350). Following authentication and confirmation 352, 354, the client terminal 310 may invoke a first application 340-1 (message 356). In response, the portal manager 330 may initiate a session with the application 340-1 (message 358) and following confirmation 360, may return a confirmation message 362 to the client terminal providing addressing data that accesses the application 340-1 directly. Thereafter, the client terminal 310 and the first application 340-1 perform interactive exchange, represented by messages 364, 366, according to processes defined for the application 340-1.

It may occur that the operator identifies a need for service from a second application 340-2. In such a case, the client terminal 310 may send another message 368 to invoke the second application 340-2. The message is addressed to the portal manager 330 and does not close the session ongoing with the first application 340-1. In response, the portal manager 330 may open a session with the second application 340-2 according to the same processes as are used for the first application 340-1. For example, the portal manager 330 may initiate a session with the second application 340-2 (via message 370) and, responsive to a confirmation message 372 received from the second application 340-2, provide a confirmation message 374 to the client terminal 310 that supplies address data for direct communication with the second application 340-2. Thereafter, the client terminal 310 and the second application 340-2 may engage in interactive exchange of data (messages 374, 376) as determined by the processes operating at the second application 340-2.

As the client terminal 310 interacts with the second application 340-2, the client terminal 310 may not remain active with the first application 340-1. A risk arises that the terminal's session with the first application 340-1 will time out and become invalid. To avoid this result, the second application may maintain a refresh timer 378 which, provided the client terminal 310 remains active within the time defined by the refresh timer 378, causes the second application 340-2 to deliver a "heartbeat" message 380 to the portal manager 330. The heartbeat message 380 indicates activity in one of the applications of the network 320. In response to the heartbeat message 380, the portal manager 330 may send messages 382 to other applications (e.g., 340-1) indicating that activity with the client terminal 310 is ongoing. In response, the other applications 340-1 reset inactivity timers for the sessions associated with the same client terminal 310, which prevents the application 340-1 from dismantling the terminal's session. Thus, continuous activity by the client terminal 310 with at least one application 340-2 can prevent timeouts from occurring with respect to other applications in the same network 320.

FIG. 4 is a functional block diagram of a portal manager 400 according to an embodiment of the present invention. The portal manager 400 may include a communication manager 410, a session manager 420 and a callback manager 430. The communication manager 410 handles portal-based communication with a client terminal via the network. For example, the communication manager processes terminal-initiated requests for service to the portal manager 400 and generates responses thereto. The communication manager 410 also may generate web pages for display via the client terminal's browser.

The session manager 420 engages applications throughout a network to build sessions between applications and authenticated client terminals. The session manager 420 maintains a session list 440, a log of sessions that have been created by the portal manager 400. Thus, when a client terminal is granted access to an application, a session ID that represents a communication session may be stored on the session list 440. When a session concludes, either because the client terminal indicates that an operator has logged off the session with the application, the client terminal indicates that its browser has closed, or the application signals that the session has timed out, the session manager may remove the corresponding session ID from the session list.

The callback manager 430 is a communication facility that supports application timeouts. It receives timeout messages from applications and engages the session manager 420 to remove a corresponding session ID from the session list 440.

The callback manager 430 may have a network presence at the termination addresses identified in the session initiation messages transmitted from the portal manager 400 to applications. Typically, these termination addresses are URLS. Thus, when an application times out due to client inactivity, the application may transmit the termination message to the network address specified in the session initiation message. Alternatively, messaging may be sent via the Simple Object Access Protocol ("SOAP") protocol, described at http://www.w3.org/TR/2001/WD-soap12-20010709/ at the time of this writing. The callback manager 430 fields the termination message and engages the session manager to remove the corresponding session ID from the session list.

Callback managers 430 also may field heartbeat messages from signifying that a client terminal is active in an application. In response, the callback manager 430 may engage the session manager 420 to review the session list and identify other applications that have active sessions with the same client terminal. The session manager 420 may send refresh messages to the other applications to prevent their sessions from timing out.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer system, comprising:
a network including a plurality of servers executing a portal manager to maintain portal-based communication with a client terminal and a first application,
wherein the portal manager is configured to receive an authentication request directly from the client terminal and authenticate and admit the client terminal to the network and to establish a session between the requesting client terminal and the first application, wherein once the session is established, the first application is configured to communicate directly with the client terminal without communicating through the portal manager,
wherein the first application is configured to engage in interactive exchange with the client terminal and, after and in response to a period of no communication between the first application and the client terminal exceeding a predetermined length, send a termination message to the portal manager indicating that the session is invalid, and
wherein, in response to a second session being initiated between a second application and the client terminal, the second application delivers heartbeat messages at a predefined periodic rate to the portal manager, and in response to each heartbeat message, the portal manager sends an activity message to the first application, wherein receipt by the first application of the activity message at a predefined periodic rate prevents the first application from generating the termination message.

2. The computer system of claim 1, wherein the portal manager provides a navigation tool to the client terminal and the client terminal identifies the first application in response to the navigation tool.

3. The computer system of claim 1, wherein the portal manager comprises:
a communication manager provided in communication with the client terminal, and
a session manager to assign a new session identifier to a new session and to provide a termination address to the first application corresponding to the new session identifier, the first application being configured to send the termination message to the termination address.

4. The computer system of claim 3, wherein the portal manager further comprises a callback manager having a network presence at the termination address, to field the termination message from the first application and to cause the session manager to remove a corresponding session ID from the session list.

5. The computer system of claim 1, wherein the first application maintains a timer that is reset by receipt of the activity message.

6. The computer system of claim 1,
wherein the first application does not authenticate the client terminal, and
wherein the termination address comprises a URL.

7. The computer system of claim 1, wherein the first application includes computer program instructions to determine if the period of no communication between the first application and the client terminal exceeds the predetermined length.

8. A computer system, comprising:
a plurality of networked servers executing a portal manager to authenticate and maintain portal-based communication with client terminals and a plurality of applications,
wherein the plurality of applications each invalidate a communication session with a client terminal and send a termination message to the portal manager indicating that the session is invalid after and in response to a predetermined period of no communication between the application and the client terminal, and communicate a refresh message to the portal manager during a predetermined period of communication with a client terminal, and
wherein, upon receipt of a refresh message from one application in communication with the client terminal, the portal manager causes other applications in communication with the same communication terminal to reset their measures of no communication with respect to the terminal.

9. The computer system of claim 8, wherein the portal manager initiates a session between an application and the client terminal by providing a session ID to the application and the client terminal and by providing a termination address to the application, wherein the application is configured to send the termination message to the termination address.

10. The computer system of claim 9, wherein the portal manager comprises a callback manager having a network presence at the termination address, to field the termination message from the application and to cause the session manager to remove a corresponding session ID from its records.

11. The computer system of claim 8, wherein the portal manager comprises:
a communication manager provided in communication with the client terminal, and
a session manager to assign a new session identifier to a new session and to provide a termination address to applications corresponding to the new session identifier, wherein the applications are configured to send the termination message to the termination address.

12. A communication management method, comprising:
responsive to a request directly from a terminal to a portal manager to invoke a first application, authenticating and assigning a session ID to a communication session between the terminal and the first application by the portal manager, the communication session being directly between the terminal and the first application without communicating through the portal manager, communicating the session ID and a termination address to the first application by the portal manager,
adding the session ID to a session list,
communicating the session ID to the terminal by the portal manager, and
responsive to a termination message received from the first application at the portal manager at the termination address, the termination message indicating that the session is invalid and sent by the first application to the portal manager after and in response to a period of no communication between the first application and the client terminal exceeding a predetermined length, removing the session ID from the session list by the portal manager,
wherein, after a second session is initiated between a second application and the terminal, the portal manager receives heartbeat messages at a predefined periodic rate from the second application, and in response to each heartbeat message, the portal manager sends an activity message to the first application, wherein the sending by the portal manager of the activity message at a predefined periodic rate prevents the first application from generating the termination message.

13. The method of claim 12, further comprising authenticating the terminal.

14. The method of claim 13, further comprising, from the terminal, directly engaging the first application without requiring separate authentication with the first application.

15. The method of claim 12, wherein the termination message is transmitted to a URL specified in the termination address.

16. The method of claim 12, wherein the termination message conforms to the SOAP protocol.

17. A communication method, comprising:
establishing multiple communication sessions each between a requesting agent and a respective application and authenticating the requesting agent by a central communication manager, each session associated with a predetermined inactivity timeout corresponding to a period of no communication between the requesting agent and the respective application and each session traversing a communication path that omits the central communication manager, wherein each application is configured to provide a termination message to the central communication manager after and in response to the predetermined inactivity timeout and indicating that the session is invalid,
responsive to a message from one application to the manager indicating ongoing activity with the requesting agent, communicating by the manager to other applications having active sessions with the requesting agent to refresh the inactivity timeout.

18. The method of claim 17, further comprising, before the establishing with a first application, assigning a session ID to a communication session between the terminal and the applications,
communicating the session ID and a termination address to the first application, the first application being configured to send the termination message to the termination address,
adding the session ID to a session list, and
communicating the session ID to the terminal.

19. The method of claim 18, further comprising, before the establishing with a second application, communicating the session ID and a termination address to the second application, the second application being configured to send the termination message to the termination address.

20. The method of claim 17, further comprising, upon expiration of the inactivity timeout at one of the applications, communicating a termination message to a callback manager.

21. A non-transitory computer-readable storage medium having program instructions, which, when executed by at least one processor in a network, perform a method, the method comprising:
receiving, from a client terminal, an authentication request at a portal manager running on the at least one processor;
authenticating, by the portal manager, a user of the client terminal in response to the authentication request from the client terminal;
receiving, at the portal manager from the client terminal, a session request for a session between the client terminal and a first application running on the network;
initiating, by the portal manager, the session between the client terminal and the first application;
receiving, directly by the first application from the client terminal without passing through the portal manager, session communications;
maintaining, by the first application, an inactivity timer having a value based on a length of time since a most recent session communication received at the first application from the client terminal;
upon the inactivity timer indicating that no session communications have been received, by the first application from the client terminal, for longer than a predetermined period of time, sending, from the first application to the portal manager, an inactivity termination message to communicate to the portal manager that the session between the first application and the client terminal is no longer valid;
receiving, from the client terminal, a second session request for a session between the client terminal and a second application running in the network;
initiating, by the portal manager, the session between the client terminal and the second application;
receiving, directly by the second application from the client terminal without passing through the portal manager, second session communications;
maintaining, by the second application, a refresh timer counting a second predetermined period of time;
upon receiving session communications, by the second application from the client terminal, within the second predetermined period of time, sending a heartbeat message by second application to the portal manager at the end of the second predetermined period of time;
upon receiving, by the portal manager, the heartbeat message from the second application, sending, by the portal manager, an activity message to the first application; and
upon receiving, by the first application, the activity message from the portal manager, resetting the inactivity timer so that it restarts measuring the time since a most recent session communication was received by the first application from the client terminal.

* * * * *